UNITED STATES PATENT OFFICE.

LUDWIG BEREND, OF AMÖNEBURG-ON-THE-RHINE, GERMANY.

PROCESS FOR SOLIDIFYING EMULSION PRODUCTS.

1,167,373. Specification of Letters Patent. Patented Jan. 11, 1916.

No Drawing. Application filed June 4, 1914. Serial No. 843,026.

*To all whom it may concern:*

Be it known that I, LUDWIG BEREND, chemist, citizen of Germany, subject of the King of Prussia and Emperor of Germany, residing at Landgrabenweg 14, Amöneburg-on-the-Rhine, in the Kingdom of Prussia and Empire of Germany, have invented new and useful Improvements in Processes for Solidifying Emulsion Products, of which the following is a specification.

This invention relates to processes of solidifying emulsion masses made from oils, hydrocarbons and the like.

It is well known to convert petroleum and similar hydrocarbons into a solid form either by uniting them with hard oil soaps or rosin soaps or with substances of the nature of glue or size. The former have the defect that when the solid fuels made from them are burnt, the oil flows out, so that the masses are unsuitable for being burnt in furnaces having grates, and, in addition, the processes are too expensive in economic respects. The latter, on the other hand, are not stable in water and can be converted into a permanently solid form only when animal size is employed and hardened after being solidified. A process in which animal size is liquefied by heat and mixed with petroleum until it is quite thickened is based on this latter method. The mass is then dried in the air, or the size is hardened, i. e. it is converted into a form insoluble in water by tanning substances, such as formaldehyde, chromic acid, sulfate of iron or the like. This known process is likewise relatively troublesome and expensive, so that the fuel made by it is not adapted to be largely employed.

The subject-matter of this invention is a very simple process of solidifying petroleum and similar hydrocarbons, oils, tar and the like, and is based on the manufacture of emulsion masses from suitable colloids and the oils or the like in question, those colloids being preferred which result in masses of as great value and as consistent as possible. These masses can become solid by remaining in the air for a long time and by means of suitable loading materials. It has been found, however, that such viscous emulsion masses, which must contain as little water as possible, can be solidified at once when they have incorporated in them substances, such as burnt lime, which remove water, particularly form hydrates, and which are added in a state of as fine division as possible and are preferably mixed with some of the oil to be solidified. It is found that the desired effect of solidification is obtained with about 1/7th of the theoretically necessary quantity of lime (calculated with reference to the water which is employed). The mass obtained is stable in water.

The following quite general example will serve to illustrate the improved process: 100 g. inspissated sulfite cellulose waste liquor are gradually mixed with 1400 g. petroleum and 100 g. water into a stiff mass, whereupon 40 g. burnt lime in a very finely pulverized state with about 40 g. petroleum are mixed therewith. As soon as the lime is uniformly distributed the mass thickens rapidly and finally congeals into a hard lump. Preferably, before adding the lime, some loading material, such as peat, wood flour, brown coal or lignite, coke, waste straw, fibrous material and the like is added, and blocks of any desired shape are preferably pressed out of the not quite congealed mass.

This process can be varied within wide limits by employing very different kinds of oils, solutions of rosin, pitch, paraffin, asphalt, wax, and the like, and various kinds of colloids, and by using other substances which form hydrates instead of quick-lime. Also, the admixture and selection of the loading materials may vary as desired.

It is important for the emulsion mass to be worked up as intimately as possible with small quantities of water and colloidal substance, so that the oil to be solidified predominates and the hardened mass is stable in water.

The emulsion masses can be employed in many different ways. They are primarily intended for employment as fuels, mineral or tar oils and inspissated chemical pulp waste liquors being specially suitable for this purpose. Owing to the absorption properties of chemical pulp waste liquors these are the most suitable emulsion bodies and, in addition, have a calorific value not to be underestimated and are a very inexpensive waste material. Nitrogenous masses, such as animal size or casein, are not so suitable because they retard the combustion, cause disagreeable odors and are rather expensive.

The described process can also be employed for making solid masses from asphalt, wax, tar, pitch, rosin, oils of all kinds and the like, by making highly concentrated emulsions from these substances and finally, if desired, after adding suitable loading materials, solidifying them with a means which withdraws water. When the process is carried into practice in this manner it is possible to employ it in road construction for making a hard, very strong facing of bitumen, the troublesome, expensive and dangerous melting of the bitumen as in known processes being obviated. For this purpose the emulsion mass in question made from bitumen is mixed with a suitable material, such as sand or the like, and then the lime or some other hydrating substance is added, and this mass is applied to the road to be faced, whereupon it hardens completely after a few hours. The water which is not bound by the small admixture of lime rapidly evaporates and is of no importance with regard to the durability of the facing, because owing to the employment of only very small quantities of the emulsion body as compared with the mass to be emulged the emulsion character is changed and stability in water is obtained.

In the hereindescribed process the effect obtained is based on the water of the emulsion body being for the most part removed and on this body being thereby congealed. As the same is finely distributed through the entire emulsion structure a solid or firm skeleton is produced which imparts great strength to the final product. Of course emulsions having a smaller precentage of oils or the like can be solidified, but then correspondingly larger quantities of lime are required and such masses could then be suitably used only in such cases in which the emulsion body is important for the purpose in view. For example, a fuel of high calorific value is obtained from about equal parts of mineral oil or tar oil and sulfite waste liquor, which can be molded well without lime or other solidifying agents solely by an admixture of loading material, but then the calorific value of the oil is diminished so much that the advantage over other fuels is no longer so considerable. When waste sulfite liquor is employed the described process enables this cheap and troublesome waste product to be employed to much greater advantage than heretofore, the advantage being obtained that the sulfuric acid in the liquor is bound by the lime and the masses obtained are still more stable.

I claim:—

1. A process of solidifying mineral, tar and other oils, hydrocarbons, asphalt, wax, rosin and the like, consisting in emulging the same with a small quantity of a colloidal substance and water and in mixing therewith so much of a body which removes water that the resulting solid mass cannot be converted by water into an emulsion solution.

2. A process of solidifying mineral, tar and other oils, hydrocarbons, asphalt, wax, rosin and the like, consisting in emulging the same with a small quantity of a colloidal substance and water and in mixing therewith so much of a de-hydrating body that the resulting solid mass cannot be converted by water into an emulsion solution.

3. A process of solidifying mineral, tar and other oils, liquid hydrocarbons and solutions of solid substances in oils, consisting in emulging the same with sulfite cellulose waste liquor, and in hardening the emulsion mass thereby obtained with so much of a body which removes water that the resulting solid mass cannot be converted by water into an emulsion solution.

4. A process of solidifying mineral, tar and other oils, hydrocarbons, asphalt, wax, rosin and the like, consisting in emulging the same with a small quantity of a colloidal substance and water, in adding a loading material thereto, and mixing a de-hydrating substance therewith.

5. A process of solidifying mineral, tar and other oils, liquid hydrocarbons and solutions of solid substances in oils, consisting in emulging the same with sulfite cellulose waste liquor, in adding a loading material thereto, and in mixing quick-lime therewith.

6. A process of solidifying mineral, tar and other oils, hydrocarbons, asphalt, wax, rosin and the like consisting in emulging the same with a small quantity of a colloidal substance and water, and in mixing a loading material and a de-hydrating substance therewith.

7. A process of solidifying mineral, tar and other oils, hydrocarbons, asphalt, wax, rosin and the like, consisting in emulging the same with a small quantity of a colloidal substance and water and in mixing therewith so much lime that the resulting solid mass cannot be converted by water into an emulsion solution.

In testimony whereof I have hereunto set my hand in presence of two subscribing witnesses.

LUDWIG BEREND.

Witnesses:
 MORITZ WETZEL,
 MARIA MENKE.